United States Patent [19]

Janssen Bennynck

[11] 4,142,744

[45] Mar. 6, 1979

[54] METHOD AND APPARATUS FOR COUPLING TUBULAR MEMBERS

[75] Inventor: Christian M. M. Janssen Bennynck, Moret sur Loing, France

[73] Assignee: Corning Glass Works, Corning, N.Y.

[21] Appl. No.: 843,843

[22] Filed: Oct. 20, 1977

[51] Int. Cl.² ............................................. F16L 23/00
[52] U.S. Cl. ................................. 285/368; 29/157 R; 29/446; 285/DIG. 12
[58] Field of Search ............... 284/368, 412, 363, 405, 284/DIG. 12; 29/157 R, 446

[56] References Cited

U.S. PATENT DOCUMENTS

| | | | |
|---|---|---|---|
| 1,592,175 | 7/1926 | Boyd | 285/368 X |
| 2,274,439 | 2/1942 | Tinker | 285/363 X |
| 2,940,779 | 6/1960 | Buono | 285/363 X |
| 3,135,538 | 6/1964 | George | 285/363 |
| 3,212,798 | 10/1965 | Lewis et al. | 285/DIG. 12 X |
| 3,214,201 | 10/1965 | Fonda | 285/363 |
| 3,398,978 | 8/1968 | Gasche | 285/368 X |
| 3,656,769 | 4/1972 | Jelinek et al. | 285/363 X |
| 3,977,709 | 8/1976 | Hatzis | 285/DIG. 12 X |

FOREIGN PATENT DOCUMENTS

| | | | |
|---|---|---|---|
| 917219 | 8/1954 | Fed. Rep. of Germany | 285/368 |
| 1531499 | 5/1968 | France | 285/368 |
| 1085027 | 9/1967 | United Kingdom | 285/363 |

*Primary Examiner*—Thomas F. Callaghan
*Attorney, Agent, or Firm*—Burton R. Turner; Clarence R. Patty, Jr.

[57] ABSTRACT

A coupling for flanged columnar or conduit members is described which produces a desired deformation within the coupled members and provides a preinduced stress of sufficient magnitude and opposite direction to substantially equal opposing deformation and stress encountered during operating conditions of the coupled columnar system.

4 Claims, 5 Drawing Figures

METHOD AND APPARATUS FOR COUPLING TUBULAR MEMBERS

BACKGROUND OF THE INVENTION

In the operation of many chemical systems it is necessary to utilize glass columns, vessels, conduits and piping, due to the corrosion resistance properties of glass, and particularly borosilicate glasses, such as Corning Code 7740. The glass components within the chemical system may include such items as columns, reducers, flasks, T's, elbows, and other processing components, all of which are provided with integral end flange portions utilized for connecting the various components together in an overall chemical processing system.

Under working conditions the coupled tubular members forming the columns and flow conduits for the chemical system are subjected to various forces, due to operating temperatures and pressures of the system, which tend to impart bending or bulging deformations resulting in the inducement of undesirable stresses and strains in the system. Depending upon the particular usage or operating parameters within the system, the bending moments or deformations imparted to the tubular members such as columns or pipes forming such system may be outwardly, forming a convex shape when internal pressures are generated within the system, or on the contrary may be bowed inwardly or of a concave shape when the system is operated under subatmospheric or reduced pressures relative to the pressures to which the outer walls of the system are subjected. In view of the fact that glass does not exhibit the property of plastic flow, fracture occurs under tension before there is any permanent deformation of the glass body, and accordingly for safety purposes in order to avoid the risk of rupture and failure, there are definite limits to which the tubular glass members may be subjected.

Accordingly, the present invention has overcome the problems of severe deformation and induced stresses resulting during the operation of columnar processing systems, by substantially increasing or broadening the operating limits which may be employed by the system. That is, the strength of the various elements or tubular members forming the processing system is substantially increased under operating conditions, by preinducing deformation and stresses within the tubular columns counter to that experienced during operating conditions, so that the net algebraic result of the opposing forces will be minimized to provide a substantially balanced system. Accordingly, the coupling concept of the present invention has particular applicability with respect to the utilization of flanged glass tubular members of relatively large diameters of up to about 4 or 5 feet.

SUMMARY OF THE INVENTION

In its simplest form, the present invention is directed to a coupling for joining flanged tubular members in such a manner so as to preinduce deformation and stresses within the coupled members, by providing offset forces in the coupling arrangement to thereby compensate for opposed deformation and stresses generated within the coupled members during operating conditions.

The coupling, according to the present invention, includes a pair of collar members, each of which surround one end of a pair of flanged tubular members to be connected. The collar members cooperate with the flanged portion of the tubular members in such a manner so that when the collar members are secured together, such as by nuts and bolts, a prestress is introduced into the body of the tubular members due to the action of the coupling members providing offset forces which create a torsional moment within the tubular members through the action of the coupling members on the associated flange portions of the tubular members. The prestressing of the tubular members by the coupling members creates an initial deformation of the members while they are in a non-operative condition, which deformation and resulting stresses are purposely created to counter the final deformation and resulting stresses which are produced under operating conditions. The latter deformation, which is produced by the operating conditions, is in essence absorbed by the initial deformation produced by the coupling, so as to provide a substantially balanced or neutral condition when the coupled system is in its working or operative mode.

In other words, in order that the concerns relative to the deformation and stress produced in the flanged tubular members when the system is in its operative mode may be alleviated, the flanged tubular members are subjected to the combined effect or algebraic sum of force components of opposite signs which tend to neutralize one another. That is, the coupling member produces a force resulting in deformation and stress in one direction, and the operating conditions of the system produce forces resulting in deformation and stress in an opposite direction, so that one is subtracted from the other resulting in a substantially balanced operational system having a built-in wide margin of safety between the net stresses generated during operation and those which would result in failure of the tubular members. Thus, by remaining within the boundaries of the permissible deformation of the tubular elements prior to failure, which deformation is a scalar value, it is possible by prestressing the members in the opposite direction according to the present invention, to have a deformation range substantially twice as large as that obtainable without the prestressing of the tubular members by means of the coupling device.

It thus has been an object of the present invention to provide method and apparatus for coupling tubular glass members together with preinduced deformation and/or stress to offset that deformation and/or stress which is produced in such members under operating conditions, and thereby provide a substantially neutralized or minimum stress balanced coupled system.

DESCRIPTION OF THE PREFERRED EMBODIMENTS

Figure 1:
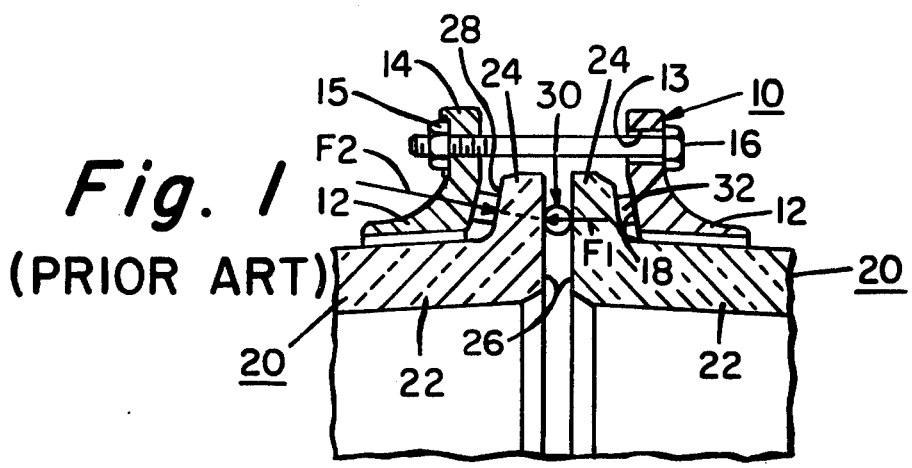
FIG. 1 is a partial half-sectional view showing a conventional coupling of two collars cooperating with the flanged ends of a pair of tubular glass members.

Referring first to FIG. 1, a conventional coupling 10 is shown comprising a pair of collar members 12, which may annularly encircle end portions 22 a pair of tubular glass members 20 having integral flange portions 24 extending radially about the axis of such tubular members 20. A sealing gasket 30 is interposed between opposed radial end surfaces 26 of the flange portions 24. A protective packing or insert 32 is interposed between a rear surface 28 of the flange portions 24 and a forward surface portion 18 on projecting radial portions 14 of the collar members 12, so as to prevent glass to metal contact between the collar members 12 and the flange portions 24 of the tubular members 20. The collar members are secured together in a coupling relationship by means of nuts 15 and bolts 16 which extend through axially aligned openings 13 formed in the radial portions 14 of collar members 12. Arrows F1 and F2 show the directions of the forces generated by the coupling 10 and transmitted respectively by the sealing gasket 30 and the packing 32 to the flange portions 24 of the tubular members 20. As noted by the dashed line extending through the flange portion 24 and joining the arrows F1 and F2, the forces exerted on the flange portion in general are substantially coincident and do not create any significant torque or produce a torsion couple within the flange.

Figure 2:
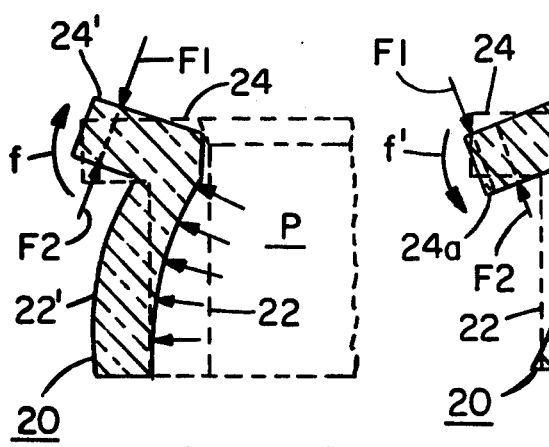
FIG. 2 is a schematic diagrammatic view, showing in an exaggerated manner, the deformation of a conventionally coupled tubular member under operating conditions.

As shown in FIG. 2, when a conventional coupling, such as shown in FIG. 1, is utilized to couple a pair of tubular members 20 together, and such members are then subsequently subjected to increased pressures P, which are frequently encountered within columnar chemical systems, the walls of the members 20 are deformed or biased outwardly with an inflated or convex shape 22' which causes the flange portions 24 to turn or rotate in a direction indicated by arrow f to a deformed position 24'. Such deformation of the tubular glass member imparts substantial stresses within the glass member, which being of a brittle material, cannot withstand undue stresses of such a nature without failure. It will be appreciated, that the deformation of the end portions from their rest position 22 to their deformed position 22' is greatly exaggerated in order to illustrate the phenomena which occurs.

Figure 5:
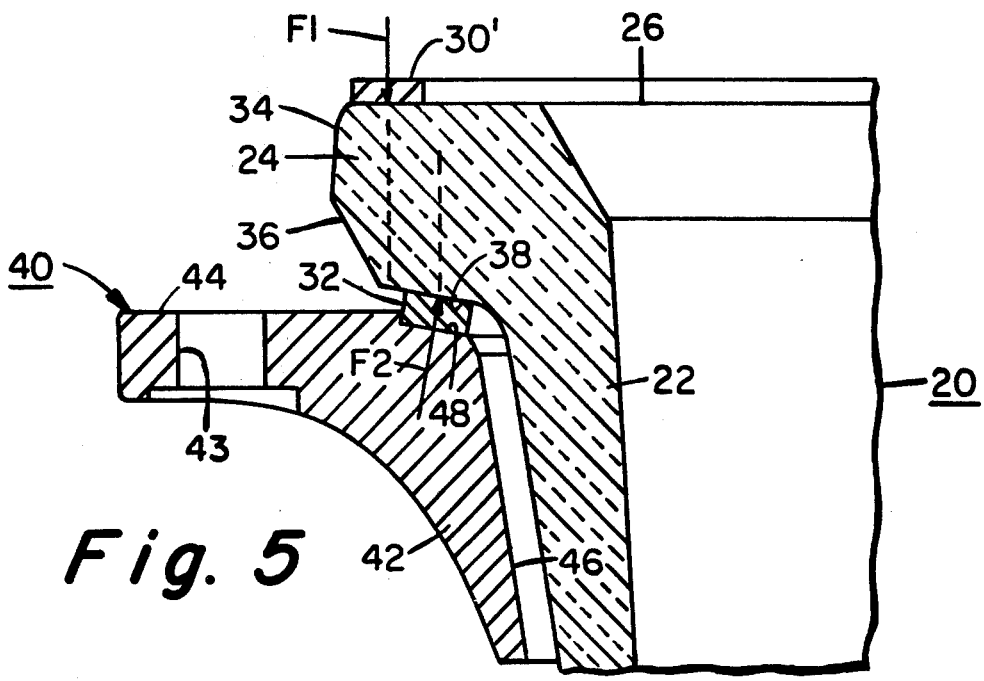
FIG. 5 is a partial sectional view in enlarged scale of an embodiment of the present invention illustrating a coupling mode for producing radially offset coupling forces.

Referring now to FIG. 5, a coupling 40 of the present invention is shown attached to one end portion 22 of a tubular glass member 20. Although only one half of the coupling 40 is shown the other half, which would be positioned about the end portion of an adjacent tubular glass member 20 to be coupled in sealing engagement with a half-width gasket 30', would be identical. The coupling 40 comprises a pair of collar members 42, each of which may annularly surround an end portion 22 of a pair of flanged tubular members 20 to be coupled. The end portions 22 are preferably strengthened to withstand the induced stresses, such as by being tapered outwardly toward flange portions 24. The collar members have radially extending portions 44 provided with openings 43 for receiving fastening means such as the nuts 15 and bolts 16. A protective packing or insert 32 is provided between the collar member 42 and flange portion 24 to prevent glass to metal contact between such collar and flange upon the tightening of the collar members and flanged end portions together in a coupling relationship. However, unlike the conventional coupling shown in FIG. 1, the axial force F2 exerted through the packing 32 by the coupling 40 is radially offset with respect to the axial force F1 exerted through the half-width externally or outwardly-radially positioned sealing gasket 30' (see also FIG. 3). That is, the packing 32 is positioned between an offset surface 48 adjacent the inner periphery 46 of the annular collar member 42 and a complimentary rear surface 38 radially-inwardly offset from the outer periphery 34 of the flange portion 24 such as by surface 36, and the half-width gasket 30' is positioned radially-outwardly of the flange portion 24.

Figure 3:
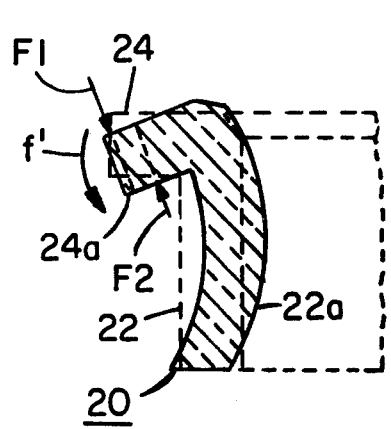
FIG. 3 is a schematic view, similar to FIG. 2, showing in an exaggerated manner, the initial deformation induced within a tubular member with the coupling method and apparatus of the present invention.

Referring now to the exaggerated schematic illustration of FIG. 3, the torque or torsion couple f' generated by the radially offset axial forces F1, F2, applied respectively through radially-offset half-width sealing gasket 30' and packing 32, tend to deform the tubular member 20 such that the end portions bow inwardly from an at rest position of 22 to a prestressed deformation 22a, providing a concave outer surface. Further, the flange portion is moved from an at rest position shown at 24 in the direction of arrow f' to an initially deformed position 24a. Since the forces F1 and F2 are not coincident, such as shown by the conventional coupling in FIGS. 1 and 2, a torsional moment is applied to the tubular member 20 through the flange portion 24 to initially deform and prestress the member 20 in a direction opposite to the forces applied to the member under operating conditions.

Figure 4:
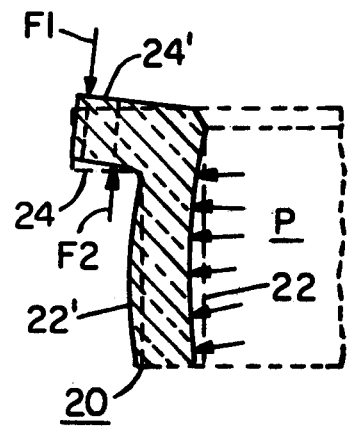
FIG. 4 is a schematic view, similar to FIG. 3, showing in an exaggerated manner, the resulting substantially balanced deformation produced when tubular members coupled together in accordance with the present invention are subjected to operating conditions.

Referring now to FIG. 4, when the prestressed coupled tubular member of FIG. 3 is subjected to internal forces which may be generated during operating conditions of a columnar chemical processing system, and represented by the arrows P, it will be noted that the initial deformation as shown in FIG. 3 reabsorbs or counters the deformation caused by the pressures P of the operating conditions and the resulting deformation of the end portion 22' and flange portion 24' is substantially less than that encountered in the prior art as shown in FIG. 2. That is, the tubular glass members 20, coupled in accordance with the present invention and when under operating conditions, will be subjected to much lower deformation and stress than that which would be encountered with a conventional coupling, since the initial deformation and stress is preinduced in a direction opposite to the deformation and stress exerted by the forces generated during operating conditions, so that the end resulting deformation and stress in the tubular glass body members is an algebraic sum of the preinduced stress and the operational stress, thus minimizing the stresses and deformations within the tubular members during actual operating conditions. It has been further found that by thermally insulating the flange portions 24 such as by an exterior band of insulating material, larger thermal stresses may be tolerated.

In the foregoing examples, the forces generated during operating conditions were shown and described as exerting an outward pressure and deformation due to increased pressures within the tubular or columnar members forming the liquid conduit or chemical processing system, however, the coupling system is equally operable to those situations wherein the pressure exerted on the outer surface of the tubular members is greater than that exerted inwardly thereof during operating conditions. That is, when the operational pressures within the conduits 20 is less than that applied exteriorly thereof, the direction of the torsional moment produced by the radially offset axial forces F1, F2, is reversed from that shown in FIG. 3 in that the application point of force F1 would be shifted radially inwardly toward the axis of the tubular member 20 with respect to the application point of force F2 which would be shifted radially outwardly away from such axis, to thereby produce an initial outwardly or convex distortion within the side walls of the tubular member.

It is generally considered an advantage to have the tubular glass members 20 within the chemical processing system exposed to as nearly a minimum stress condition as possible when the system is in its operating mode, and accordingly the prestress is determined so that the deformation induced thereby will be substantially relieved by the opposite deformation induced by the pressures produced during the operating conditions. However, should it be desired that the columns or conduits formed by the coupled tubular members have a slight deformation during operating conditions in one direction or another, the amount of preinduced stress, and accordingly the amount of deformation resulting therefrom may be varied, so that during operating conditions a residual stress and minor deformation remains within the tubular members either on one side or the other of its neutral or unstressed condition.

Although the now preferred embodiments of the invention have been disclosed, it will be apparent to those skilled in the art that various changes and modifications may be made thereto without departing from the spirit and scope thereof as defined in the appended claims.

I claim:

1. A coupling assembly joining flanged end portions of a pair of tubular glass members together in a sealed relationship for use in a delivery or processing system comprising, a pair of tubular glass members to be coupled, each said tubular member having a flanged end portion with a planar end surface positioned such that said planar end surfaces are substantially parallel to one another, a pair of collar members, each collar member surrounding an end portion of one of said flanged tubular glass members to be coupled and positioned rearwardly of said flanged end portion thereof, means for tightening said collar members in a clamping relationship for coupling said end portions together, means for preinducing stresses within tubular portions of said glass members of a desired magnitude and direction so as to minimize stresses exerted on such members during operation conditions of the system, and said stress inducing means including means for applying radially offset substantially axial forces to the flange portion of said tubular members so as to provide a torsional moment thereto and initially bow said tubular portions inwardly of said members with a preinduced deformation counter to the deformation exerted on said members during operating conditions.

2. A coupling assembly as defined in claim 1 including an annular sealing gasket interposed between a radial portion of the planar end surfaces of said coupled flanged end portions with the remaining radial portion of said end surfaces being free of said gasket, a protective packing interposed between said collar members and an adjacent flanged portion and radially offset with respect to said gasket, and said offset axial forces being applied by said coupling assembly through said gasket and packing with the application of force exerted through each being radially offset with respect to each other and the axis of the tubular members.

3. A method of coupling a pair of tubular members together with a preinduced stress such that said preinduced stress shall be minimized by stresses exerted upon such members when they are under operating conditions comprising, providing a pair of tubular members having radially extending flanged end portions terminating in planar sealing surfaces, positioning such end portions together with said planar sealing surfaces substantially parallel to one another and with a sealing gasket interposed between a radial portion of said planar sealing surfaces, squeezing said flanged end portions toward one another by applying a force to a rear surface of each of said flanged end portions at a point which is radially offset with respect to the sealing force exerted through said sealing gasket, inducing an initial torsional moment within said flanges and preinduced stresses within said tubular members which will be substantially neutralized by counter stresses exerted thereon during operating conditions, and offsetting the radial distance between the forces applied to the rear of each flange and the forces applied through the sealing gasket in a forward face thereof so that the preinduced stresses within such members will compensate for and substantially neutralize the stresses exerted thereon when subjected to operating conditions.

4. A method of coupling tubular members together as defined in claim 3 including the steps of applying the forces to the rear surface of said flange portions radially inwardly of the forces applied to said sealing gasket and initially deforming sidewall portions of said tubular member inwardly.